(12) United States Patent
Tribie et al.

(10) Patent No.: US 12,204,473 B2
(45) Date of Patent: Jan. 21, 2025

(54) SYNCHRONOUS ELECTRONIC CIRCUIT DEVICES

(71) Applicant: MELEXIS TECHNOLOGIES SA, Bevaix (CH)

(72) Inventors: Nicolas Tribie, Grasse (FR); Guido Dupont, Bevaix (CH); Paul Laval, Grasse (FR)

(73) Assignee: MELEXIS TECHNOLOGIES SA, Bevaix (CH)

( * ) Notice: Subject to any disclaimer, the term of this patent is extended or adjusted under 35 U.S.C. 154(b) by 14 days.

(21) Appl. No.: 18/297,148

(22) Filed: Apr. 7, 2023

(65) Prior Publication Data

US 2023/0325329 A1    Oct. 12, 2023

(30) Foreign Application Priority Data

Apr. 8, 2022  (EP) .................................... 22167391

(51) Int. Cl.
    *G06F 13/16*     (2006.01)
    *G06F 13/42*     (2006.01)
(52) U.S. Cl.
    CPC ...... *G06F 13/1689* (2013.01); *G06F 13/4273* (2013.01); *G06F 13/4291* (2013.01)
(58) Field of Classification Search
    None
    See application file for complete search history.

(56) References Cited

U.S. PATENT DOCUMENTS

| | | | |
|---|---|---|---|
| 9,281,005 B2* | 3/2016 | Wilson | G11B 20/10009 |
| 2017/0163366 A1 | 6/2017 | Aichriedler | |
| 2021/0303503 A1 | 9/2021 | Remple et al. | |

FOREIGN PATENT DOCUMENTS

WO       2017015222 A1      1/2017

OTHER PUBLICATIONS

Search Report from corresponding European Application No. 22167391.6, Sep. 19, 2022.

* cited by examiner

*Primary Examiner* — Farley Abad
*Assistant Examiner* — Dayton Lewis-Taylor
(74) *Attorney, Agent, or Firm* — Workman Nydegger

(57) ABSTRACT

An electronic circuit device for acquiring an analog signal. The device comprising: a data line, one or more control lines (of which at least a clock line, and configured for transmitting a stored digital measurement result using the data line and the one or more control lines, in accordance with a synchronous serial communication protocol; a detection means for recognizing a synchronization pulse on one of the one or more control lines or on the data line; wherein the device is configured for repetitively measuring the analog signal or for measuring the analog signal triggered by the synchronization pulse; and for storing one or more digital measurement results or combinations thereof when triggered by the synchronization pulse.

14 Claims, 10 Drawing Sheets

SYNCHRONOUS ELECTRONIC CIRCUIT DEVICES

FIELD OF THE INVENTION

The invention relates to the field of electronic circuit devices. More specifically it relates to triggerable electronic circuit devices which can communicate with a master device over a synchronous serial communication protocol and to electronic systems comprising a plurality of such electronic circuit devices and a master device.

BACKGROUND OF THE INVENTION

Electronic circuit devices may be configured as slaves and communicate acquired date over a synchronous serial communication protocol with a master. Examples of synchronous serial communication protocols are Serial Peripheral Interface (SPI) and Inter-Integrated Circuit (I2C).

SPI is a synchronous serial communication protocol which allows to connect multiple electronic circuit devices to a master. Each electronic circuit device is addressed sequentially using the Chip Select (CS) pin, through Slave Select (SS) pins on the master. Once a slave is selected, the communication occurs using 3 other terminals. Data is communicated using two uni-directional Master Out Slave In (mosi) and Master In Slave Out (miso) lines, and the communication is synchronized using a clock line (sck). The slave electronic circuit devices may for example be configured as sensors or analog-to-digital converters, and communicate there measurement information to the master.

The problem with such a configuration is that the slaves can only be accessed separately (though CS) and the measurements done by the slaves cannot be synchronized, the analog signal which is to be measured, e.g. the physical quantity, is not measured at the same time. If the SPI communication protocol is used to send a trigger command (i.e. command an acquisition), then the measurements are not done at the same time but will be spread in time with a fixed delay. If the slaves are configured to continuously acquire data and provide the latest data when a read command is received, the moment at which the analog signal is measured is different as each slave is sequentially addressed with a different chip select timing. Either way, the analog signal of each slave is not measured substantially simultaneously. There is, however, a need for such simultaneous measurements using multiple sensors in some applications. For example, when measuring the current in 3-phase systems, or when measuring the 3-phase currents through the coils of a motor in combination with the rotor position, or when measuring 3-phase currents in combination with 2 redundant rotor positions, by measuring the rotor position twice with different redundant sensors. Using the 2 redundant rotor positions it is possible to check the validity of the measurement.

I2C is also a synchronous digital protocol. However, in I2C, there is no chip select terminal to select the slaves, but the slaves are selected by communicating addresses on the bus. The slave having the corresponding address will execute a command and/or respond on the line. Also, a single terminal is used for bi-directional communication. As for SPI, a clock signal is used for synchronizing the communication between several slaves in one or more masters. The problem is the same as for SPI, only one slave can be addressed at a time and the acquisition commands cannot be sent simultaneously to all sensors.

There is therefore a need for electronic circuit devices which can communicate with a controller using a synchronous serial communication protocol and which can simultaneously receive an acquisition command.

SUMMARY OF THE INVENTION

It is an object of embodiments of the present invention to provide good electronic circuit devices for communicating measurement results to a controller using a synchronous serial communication protocol which can simultaneously receive an acquisition command and a good electronic system comprising such devices.

The above objective is accomplished by a device and system according to the present invention.

In a first aspect embodiments of the present invention relate to an electronic circuit device configured for acquiring an analog signal by measuring the analog signal and storing a digital measurement result which is indicative for the analog signal.

The electronic circuit device comprises a data line and one or more control lines. At least one control line is a clock line.

The electronic circuit device is configured for transmitting stored data, using the data line and the one or more control lines, in accordance with a synchronous serial communication protocol wherein a clock signal on the clock line is used for synchronizing the data on the data line. The stored data may for example be one or digital measurement results, processed versions of the digital measurement results, and/or combinations of the digital measurement results.

The electronic circuit device, moreover, comprises a detection means configured for recognizing a synchronization pulse on one of the one or more control lines or on the data line.

The electronic circuit device is configured for repetitively measuring the analog signal or for measuring the analog signal triggered by the synchronization pulse and the electronic circuit device is configured for storing the one or more digital measurement results or one or more combinations thereof when triggered by the synchronization pulse or for processing the digital measurement results and for storing the obtained data when triggered by the synchronization pulse. The electronic circuit device may for example be configured for combining the digital measurement results to obtain one or more combinations thereof and for storing the obtained one or more combinations when triggered by the synchronization pulse.

In embodiments of the present invention the electronic device is configured such that if a plurality of the electronic circuit devices are receiving the synchronization pulse, from a controller connected with the data line and the one or more control lines of the plurality of electronic circuit devices, they are simultaneously triggered by the synchronization pulse.

It is an advantage of embodiments of the present invention that it is possible to simultaneously trigger a plurality of electronic circuit devices for storing digital measurement result(s) without the need for an additional control line besides the one or more which are already present for transmitting the stored measurement result.

This is achieved by adding a detection means to the electronic circuit device, wherein the detection means is configured for recognizing a synchronization pulse on one of the control lines or on the data line, and wherein the electronic circuit device is configured for storing the last digital measurement result(s) when the synchronization pulse is detected. As the synchronization pulse can be detected on one of the one or more control lines or on the data line of the synchronous serial communication protocol, it is not required to add another control line.

It is not obvious to add a synchronization pulse to one of the one or more control lines or on the data line of the synchronous serial communication protocol because sending trigger pulses on the logic signals of the protocol itself may result in conflicts with the protocol and/or misinterpretation according to the synchronous serial communication protocol.

In embodiments of the present invention one of the one or more control lines is a chip select line.

In embodiments of the present invention the detection means is configured for recognizing the synchronization pulse on the chip select line.

In embodiments of the present invention the detection means is configured for recognizing the synchronization pulse on the clock line.

In embodiments of the present invention the synchronous serial communication protocol is a standardized serial communication protocol.

In embodiments of the present invention the synchronous serial communication protocol is the SPI protocol or the I2C protocol.

In embodiments of the present invention the detection means is configured for measuring the analog signal upon detection of the trigger pulse. This may for example be on a first edge of the synchronization pulse. The detection means may be configured for storing the digital measurement result when a second edge of the synchronization pulse is detected within a predetermined duration after the first edge.

In embodiments of the present invention the detection means is configured for storing the latest available sample.

In embodiments of the present invention digital measurement results may be combined. Thus an estimated value of the physical quantity may be obtained.

The first edge may for example be a falling edge and the second edge a rising edge.

In embodiments of the present invention the detection means is disabled after recognizing the synchronization pulse and enabled after a predetermined duration.

In embodiments of the present invention with a plurality of electronic circuit devices connected as slaves to a master, the predetermined duration is selected such that the detection means is disabled until all slaves have transmitted their data. It is an advantage of embodiments of the present invention that further acquisition is avoided until the stored measurement result is transmitted.

In embodiments of the present invention the detection means is configured for measuring the analog signal on a first edge or a second edge of the synchronization pulse.

In embodiments of the present invention the electronic circuit device comprises an internal clock and the electronic circuit device is configured for tuning and/or synchronizing the internal clock using the synchronization pulse.

In embodiments of the present invention the measured analog signal is a physical quantity and the measurement result is indicative for the physical quantity.

In a second aspect embodiments of the present invention relate to an electronic system comprising a plurality of electronic circuit devices and comprising a controller connected with the data line and the one or more control lines of the electronic circuit devices. The electronic system is configured such that a synchronization pulse of the controller is imposed to one of the control lines or on the data line of each electronic circuit device and the controller is configured for sequentially receiving the measurement results from the different electronic circuit devices.

In embodiments of the present invention the controller comprises a synchronization output line connected with one of the control lines or with the data line of the sensor devices to impose a synchronization pulse of the controller to the connected line.

In embodiments of the present invention a signal on the chip select line of an electronic circuit device is the combination of a chip select signal from the controller and a synchronization pulse from the controller.

In embodiments of the present invention the controller may comprise a chip select line for each electronic circuit device and a synchronization output line. The chip select line of an electronic circuit device may be connected with the output of an AND-gate of which the inputs are connected with the chip select line of the controller of the specific sensor device and the synchronization output line.

In alternative embodiments the combinatorial logic of the AND-gates may be implemented in the controller itself.

In embodiments of the present invention where the chip select signal is combined with the synchronization pulse on the same line, both signals are not simultaneously active.

In embodiments of the present invention a signal on the clock line of an electronic circuit device is the combination of a clock signal from the controller and a synchronization pulse from the controller.

In embodiments of the present invention where the clock signal is combined with the synchronization pulse on the same line, both signals are not simultaneously active.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
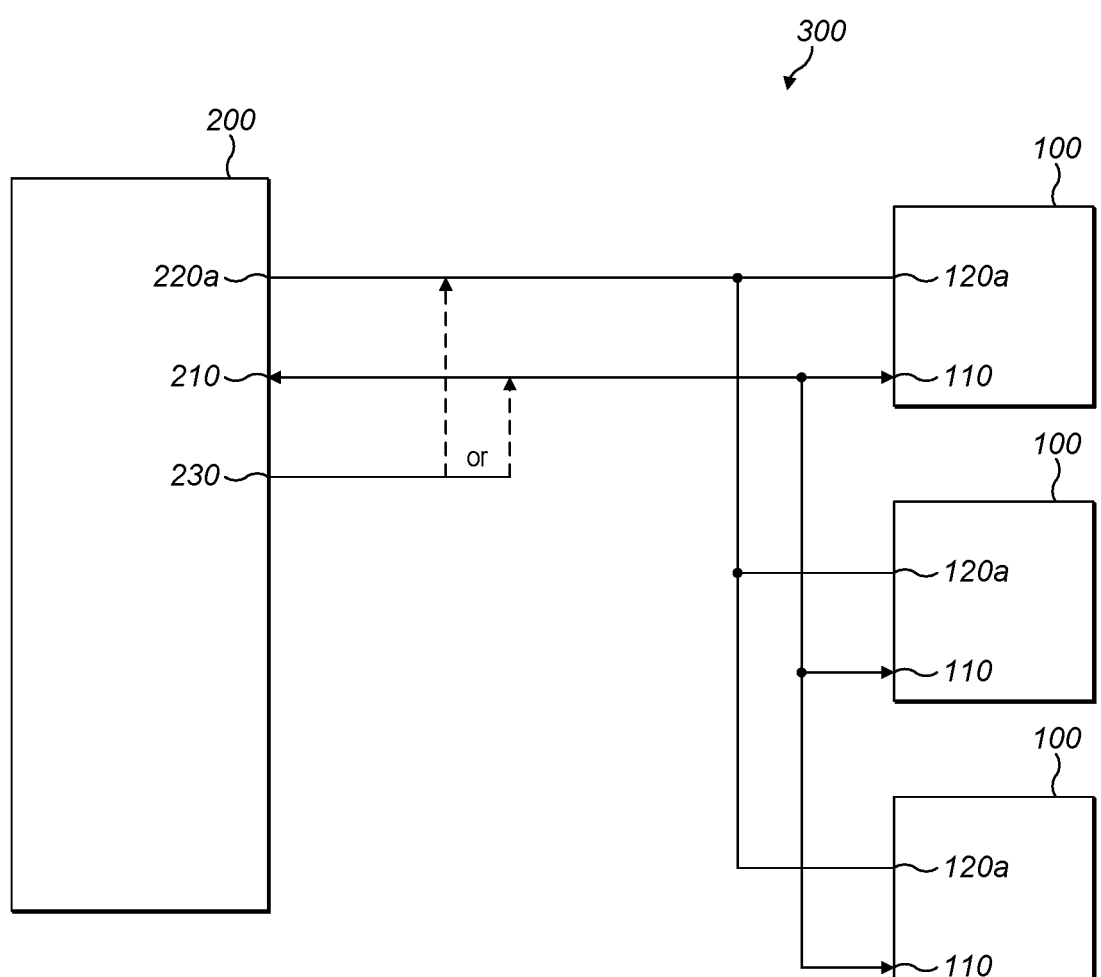
FIG. 1 shows a block diagram of an electronic circuit device and of an electronic system in accordance with embodiments of the present invention.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the present invention reference is made to a synchronization pulse, reference is made to a pulse on a control line or data line. This pulse may comprise a falling edge followed by a rising edge if the default level on the line is a high level, or a rising edge followed by a falling edge if the default level on the line is a low level.

Where in embodiments of the present invention reference is made to an action which is triggered by a synchronization pulse, this action is performed in response to the synchronization pulse. This may be immediately after, or a predefined time after the synchronization pulse. These actions may for example be measuring of an analog signal, storing one or more digital measurement results or combinations thereof, processing digital measurement results followed by storing the obtained data. The digital measurement results may be obtained by repetitive measurements or when triggered by the synchronization pulse.

In a first aspect embodiments of the present invention relate to an electronic circuit device 100 configured for acquiring an analog signal by measuring the analog signal and storing a digital measurement result which is indicative for the analog signal. An exemplary embodiment of such an electronic circuit device 100 is shown in the block diagram of FIG. 1.

The electronic circuit device 100 comprises a data line 110 and one or more control lines 120. At least one control line is a clock line 120a. The electronic circuit device 100 is configured for transmitting the stored digital measurement result, using the data line 110 and the one or more control lines 120. It therefore uses a synchronous serial communication protocol. According to the protocol a clock signal on the clock line 120a is used for synchronizing the data on the data line 110. In embodiments of the present invention the electronic circuit device is configured for sampling the incoming analog signal synchronous with the clock signal on the clock line.

The electronic circuit device, moreover, comprises a detection means 130 configured for recognizing a synchronization pulse on one of the one or more control lines 110 or on the data line 110. In embodiments of the present invention the electronic circuit device 100 is configured for repetitively measuring the analog signal. In embodiments of the present invention the electronic circuit device is configured for measuring the analog signal triggered by the synchronization pulse. Thus, one or more digital measurement results are obtained. The electronic circuit device is, moreover, configured for storing the most recent one or more digital measurement results or one or more combinations thereof when triggered by the synchronization pulse or for processing the digital measurement results and storing the obtained data (e.g. combining the digital measurement results to obtain one or more combinations thereof and for storing the obtained one or more combinations) when triggered by the synchronization pulse. In embodiments of the present invention the most recent one or more digital measurement results or one or more combinations thereof may be stored when triggered by the synchronization pulse.

In embodiments of the present invention the electronic circuit devices are configured such that if a plurality of the electronic circuit devices are receiving the synchronization pulse, from a controller connected with the data line 110 and the one or more control lines 120 of the plurality of electronic circuit devices 100, they are simultaneously triggered by the synchronization pulse.

In embodiments of the present invention the electronic circuit device 100 may be configured for triggering the measurement or measurements of the analog signal when receiving the synchronization pulse and for storing the last digital measurement result or a combination of the last digital measurement results after measuring. The combination may for example be an average or an interpolated value of digital measurement results. The samples could all be acquired before the trigger pulse, after the trigger pulse, or before and after the trigger pulse. The combining of the digital measurement results may be achieved by a calculation according to a predefined formula to extract the physical quantity or another physical quantity different from the measured one. For example, in a magnetic position sensor, two components of the magnetic field can be measured and the position of a magnet can be determined by calculation based on a function of the two components of the field. The combining may for example be done by interpolating or extrapolating the measurement results. This may be done by calculating an estimated value at a predefined time Td related to the trigger pulse based on two or more samples (Td can be positive, negative, or 0). The interpolation may for example be linear interpolation, polynomial interpolation, spline interpolation, or any other interpolation known to the person skilled in the art. Alternatively, an estimate of the analog signal may be obtained by extrapolating the digital measurement results.

In embodiments of the present invention the electronic circuit device 100 may be configured for repetitively measuring the analog signal and for storing the last digital measurement result or combination of the last digital measurement results, when receiving the synchronization pulse. The higher the sampling rate, the lower the jitter will be. In embodiments of the present invention the sampling rate may for example be higher than 1 MSPS or even be higher than 10 MSPS.

It is an advantage of embodiments of the present invention that it is possible to simultaneously trigger a plurality of electronic circuit devices for storing the most recent digital measurement result(s) without the need for an additional control line besides the one or more which are already present for transmitting the stored measurement result.

In embodiments of the present invention the synchronous serial communication protocol is a standardized serial communication protocol. The synchronous serial communication protocol may for example be the SPI protocol or the I2C protocol.

In a second aspect embodiments of the present invention relate to an electronic system 300 comprising a plurality of electronic circuit devices 100, in accordance with embodiments of the present invention, and comprising a controller 200. An exemplary embodiment of such an electronic system 300 is shown in FIG. 1.

The controller 200 is connected with the data line 110 and the one or more control lines 120 of the electronic circuit devices 110. In embodiments of the present invention the controller may be a microcontroller. In embodiments of the present invention the controller may be implemented in a field programmable gate array.

The electronic system 300 is configured such that a synchronization pulse of the controller 200 is imposed to one of the control lines 120 or on the data line 110 of each electronic circuit device 100. This may be via a synchronization output line 230 of the controller 200, which is connected with one of the control lines or with the data line of the electronic circuit devices 100 as illustrated in FIG. 1. Alternatively, this connection may be internal to the controller 200. In that case the controller is configured for imposing the synchronization pulse to a control line 220 which is connected with control lines 120 of the electronic circuit devices, or to a data line 210 which is connected with the data lines 110 of the electronic circuit devices.

In embodiments of the present invention the controller 200 is configured for sequentially receiving the digital measurement results from the different electronic circuit devices.

The electronic circuit device may comprise an AD converter for converting the analog signal into a digital signal.

In embodiments of the present invention the electronic circuit device is a sensor. In that case the measured analog signal is a physical quantity and the measurement result is indicative for the physical quantity. The sensor may for example be a magnetic sensor, a position sensor, a current sensor, or a temperature sensor. In embodiments of the present invention the electronic circuit device is an integrated circuit (IC). The integrated circuit may for example be an analog-to-digital converter integrated circuit, or a sensor integrated circuit (e.g. Hall effect IC).

Figure 2:
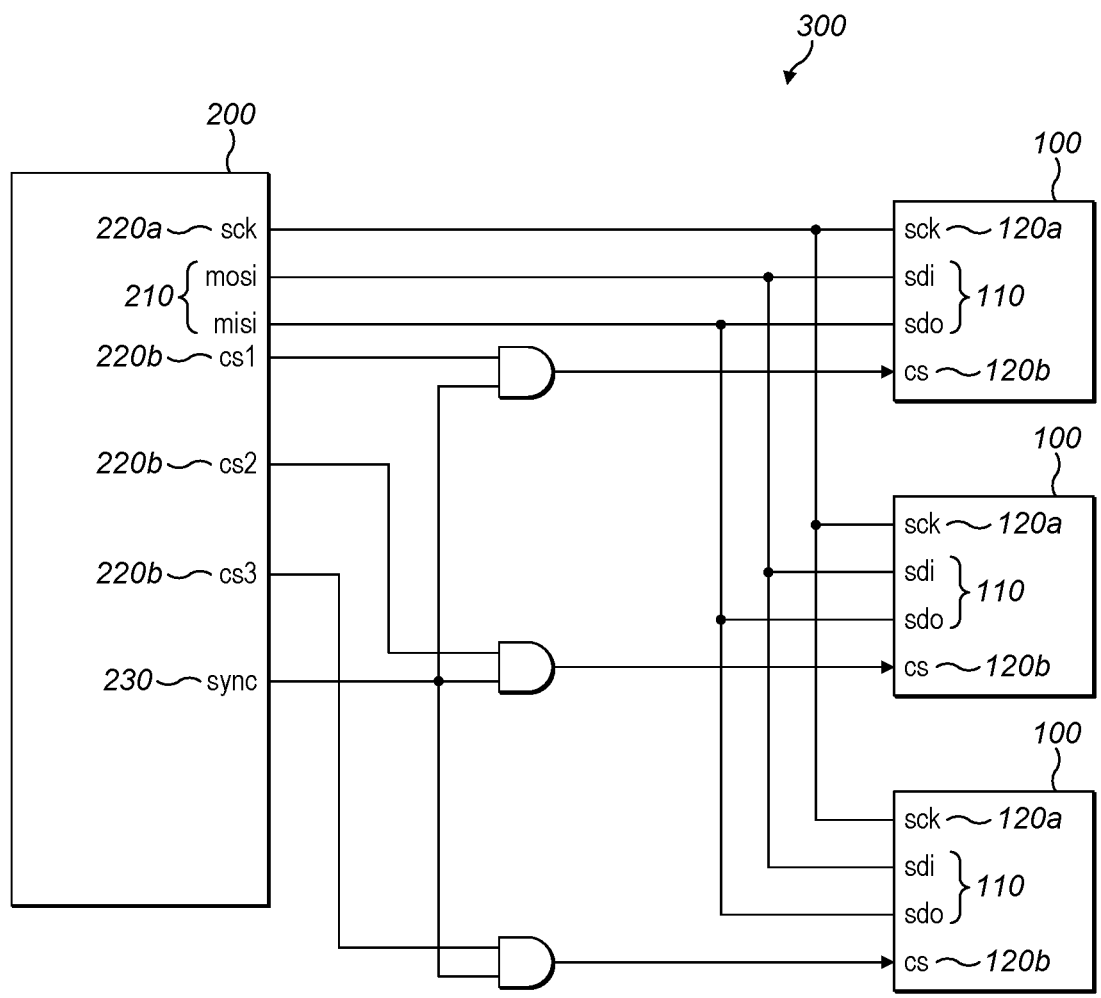
FIG. 2 shows a block diagram of an electronic circuit device and of an electronic system, wherein the communication protocol is the SPI protocol, in accordance with embodiments of the present invention.
Figure 3:
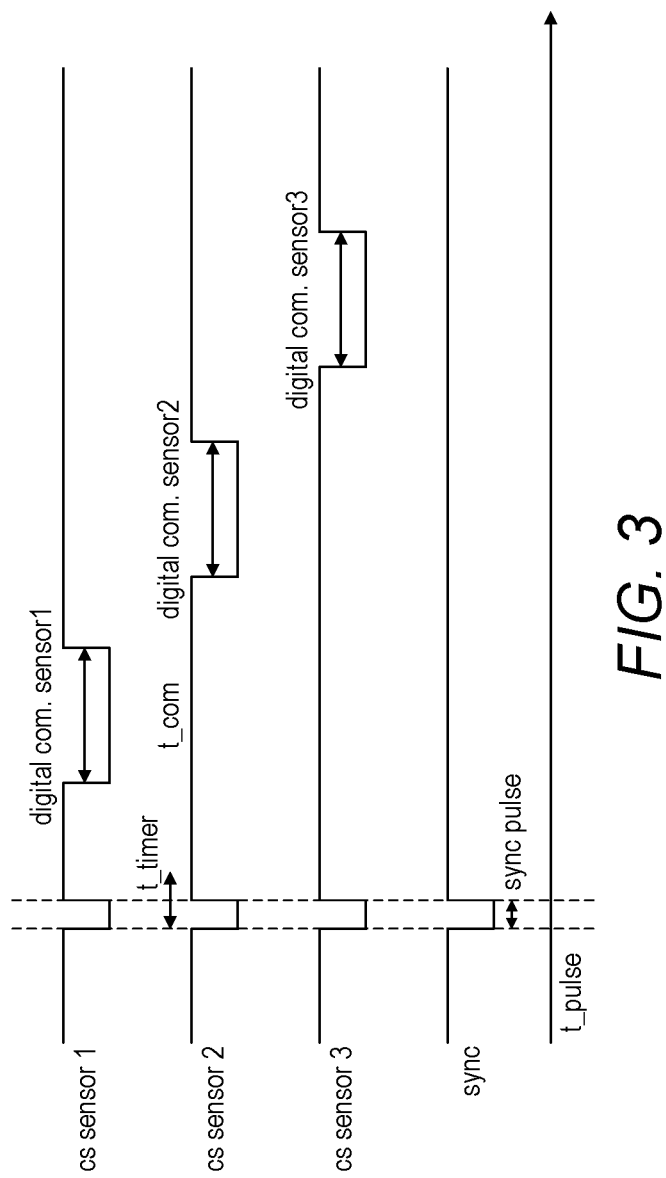
FIG. 3 shows a time diagram, illustrating the synchronization pulse and communication time slots, of chip select lines of electronic circuit devices in accordance with embodiments of the present invention.

FIG. 2 shows a schematic block diagram of electronic circuit devices 100 and of an electronic system 300, according to embodiments of the present invention, wherein the communication between the electronic circuit devices 100 and the controller 200 are based on the SPI protocol. In such an embodiment a synchronization pulse is added on the chip select (CS) line 120b of the electronic circuit devices 100. This may be achieved via external gates and synchronization terminal 230. The external gates and synchronization terminal are optional. The synchronization pulse can be combined internally such as to be superimposed on each CS terminals and generate the timing diagram of FIG. 3. The synchronization pulse is received at the same time by each electronic circuit device 100 (which may for example be a sensor). The electronic circuit device has detection means for recognizing the trigger pulse. In this exemplary embodiment of the present invention the trigger pulse triggers an acquisition at the sensors, thus all sensors measure an analog signal (e.g.

a physical quantity) at a same time, digitize the value and store the value. In a second phase, the microcontroller reads the value of each electronic circuit device in a sequential manner using the standard serial digital protocol. In this example an SPI protocol is used: the microcontroller 200 selects the first electronic circuit device using the cs1 terminal 220b, and issues a read command. The electronic circuit device recognizes that an SPI communication is started and sends the data. In embodiments of the present invention the electronic circuit device is configured to distinguish the read command from the synchronization pulse (e.g. based on the pulse length). The operation is then sequentially repeated for the other electronic circuit devices connected to the bus. Using this solution, a standard SPI protocol can be used at the controller side. On the sensor side, a detection means for distinguishing between a sync pulse and a digital communication is needed. This detection means may be implemented as a control circuit.

In embodiments of the present invention a synchronization pulse is transmitted/decoded on a line of a (standard) synchronous serial digital communication interface.

An obvious solution would be to add an additional trigger pin to each electronic circuit device, and connect it to the synchronization pin of the microcontroller. This, however, would result in more pins and more wires.

In the present invention, on the contrary, trigger pulses are sent on the control line(s) and/or on the data line(s) which are used for the logic signals of the protocol itself. Therefore, additionally a detection means, is provided which is configured for recognizing these synchronization pulses.

Thus, electronic circuit devices are obtained which allow a synchronized acquisition, and fast digital output rate. Moreover, the electronic circuit devices have a lower pin count compared to electronic circuit devices to which an additional synchronization pin is added.

In embodiments of the present invention the detection means 130 is configured for recognizing a synchronization pulse on one or more of the control lines or on the data line.

In embodiments of the present invention the electronic circuit device comprises an internal clock derived from an internal oscillator (e.g. RC oscillator). This clock may be used for timing the internal operation cycle of the sensor. In embodiments of the present invention the electronic circuit device is configured for tuning and/or synchronizing the internal clock using the synchronization pulse. Synchronizing an oscillator on a reference signal is well know in the art. It may for example be done by comparing a time interval related to the synchronization pulse (e.g. duration of the pulse, or interval between two or more pulses) to a time interval derived the internal clock of the electronic circuit device and adapting the frequency of the RC oscillator such that the two intervals match. The adaptation can be done by acting on the resistance or the capacitance of the RC oscillator, e.g. in a digital manner. The tuning can be done at each synchronization pulse, or every N synchronization pulses with N>1. In addition to the frequency, the phase of the internal oscillator can be optionally synchronized as well, however this is not required. The internal clock may for example be an RC oscillator which has+/−10% frequency tolerance before synchronization. An advantage of the tuning/synchronization of the internal clock is that the timing can be better controlled and the jitter between the sensor acquisitions and/or interpolations can be further reduced (e.g. over the full temperature range). This allows for example to reduce the residual timing error between the sensors acquisitions and/or interpolation and measure the physical quantity in a reduced time window. The effective timing error between the sensors acquisitions and/or interpolation may be lower than 10 microseconds, or lower than 1 microsecond, or lower than 300 ns, or lower than 100 ns.

In embodiments of the present invention the detection means is configured for detecting a first edge and a second edge of the synchronization pulse and for recognizing the synchronization pulse when the second edge of the synchronization pulse is detected within a predetermined duration after the first edge.

In embodiments of the present invention this predefined duration may be shorter than the communication duration.

In embodiments of the present invention the synchronization pulse may be detected/recognized when its duration is substantially equal to a predefined duration, e.g. between a predefined upper and a predefined lower limit. The lower limit may be selected such that interferences are not mistaken for a synchronization pulse and the upper limit may be selected such that a communication pulse is not mistaken for a synchronization pulse. In such embodiments, the synchronization pulse is detected if its duration is within a predetermined time window.

In embodiments of the present invention, wherein the synchronization pulse is detected on a clock line, this predefined duration may be longer than a clock cycle.

Measuring the analog signal may be triggered on the first edge (e.g. falling edge) of the sync pulse. Storing the digital measurement result may be done when a second edge of the synchronization pulse is detected within a predefined duration after the first edge. An example thereof is shown in the timing diagram illustrated in FIG. 3. The effect is that all the electronic circuit devices acquire their respective physical quantity substantially at the same time, even though they run on asynchronous clocks. The duration of the synchronization pulse t_pulse may be configured to be shorter than the communication duration t_com. In this case, the electronic circuit devices store the data only if a synchronization pulse is recognized, for example when a second edge (e.g. rising edge) is detected within a predefined duration (e.g. <than t_timer) following the first edge (in this example falling edge). The predefined duration t_timer is selected to be longer than the duration of a synchronization pulse t_pulse but shorter than the communication duration t_com.

In an alternative embodiment of the present invention, the detection means is disabled after the synchronization pulse is detected, such as to avoid a further storing of a digital measurement result when the next falling edge (the one for the digital communication phase) is detected. The detection means may then for example be re-enabled after a successful communication sequence, or after a predetermined duration In yet another embodiment of the present invention, measuring the analog signal is triggered on the second edge of the trigger pulse (in this case a rising edge). After the synchronization pulse is received and the measurement is done and stored, the master (i.e. controller 300) will retrieve the data from each sensor on the line, by sequentially pulling the corresponding CS pin low, and communicated data using the SPI terminals (mosi, miso, clk).

Figure 4:
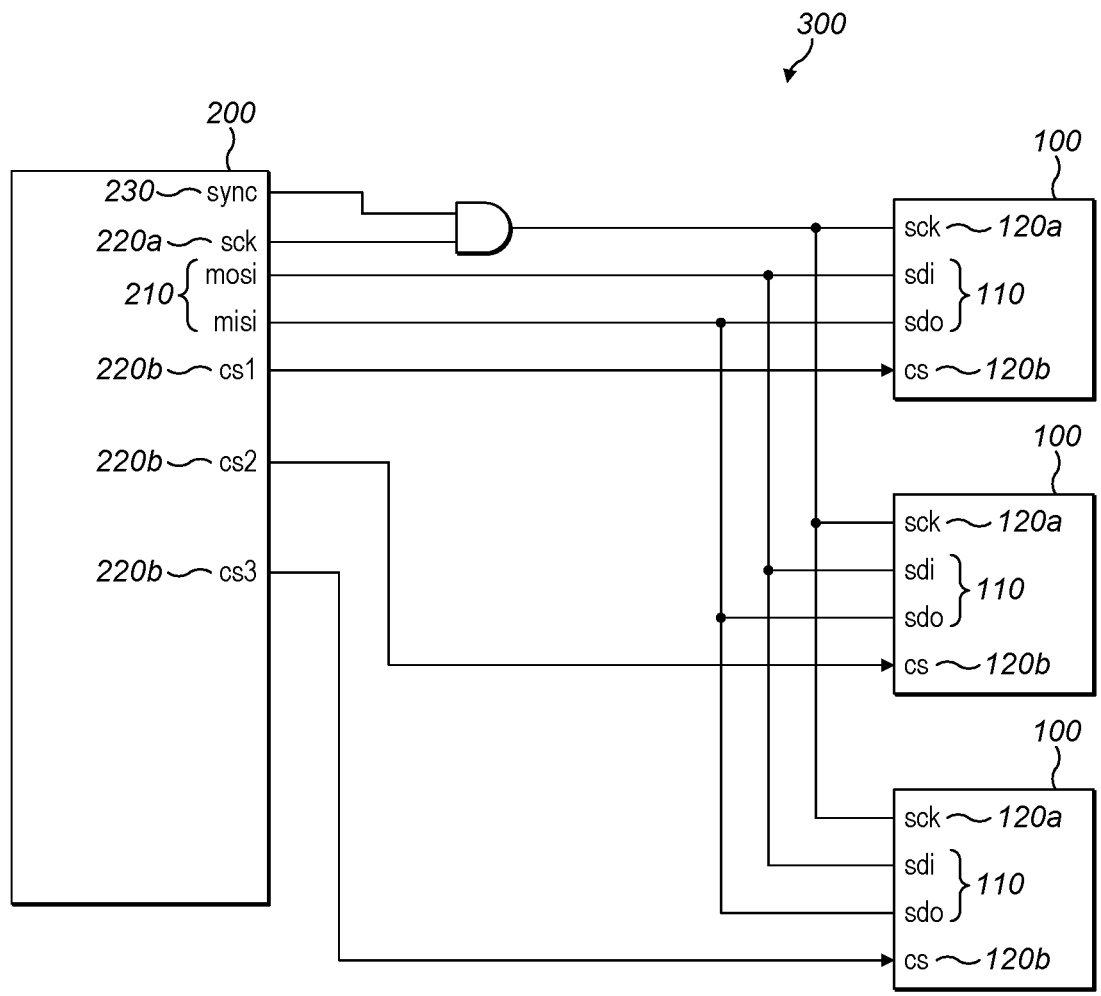
FIG. 4 shows a block diagram of an electronic circuit device and of an electronic system, wherein the synchronization pulse is sent over the clock line, in accordance with embodiments of the present invention.

FIG. 4 shows a schematic block diagram of an electronic circuit device and of an electronic system in accordance with embodiments of the present invention. In embodiments of the present invention the synchronization pulse is sent on a different terminal of the serial interface. In this example the synchronization pulse is sent on the clock terminal sck. This may be done externally using the AND-gate as shown in FIG. 4, or the synchronization pulse may be superimposed on the clk signal internally in the controller. In that case no external gate is needed for the controller.

The detection means is configured for distinguishing the synchronization pulse on the clock line sck. This can for example be achieved by simultaneously monitoring the chip select pin cs as the cs pins are all in a high state when the bus is idle. In this embodiment, the trigger may be disabled for a certain duration after the synchronization pulse is received in order to avoid that the toggling of sck during communication is interpreted as a synchronization pulse (see timing diagram in next slide).

In embodiments of the present invention a synchronization pulse may be imposed on the data line. In an electronic circuit device with an SPI interface this may for example be done on the mosi line. In alternative embodiments of the present invention the SPI interface comprises only 3 wires (no SDI).

In some implementations SPI uses 3-wires only (i.e. the controller can only receive data from the electronic circuit device. In embodiments of the invention only the SDI-line is used for imposing the synchronization pulse.

Figure 5:
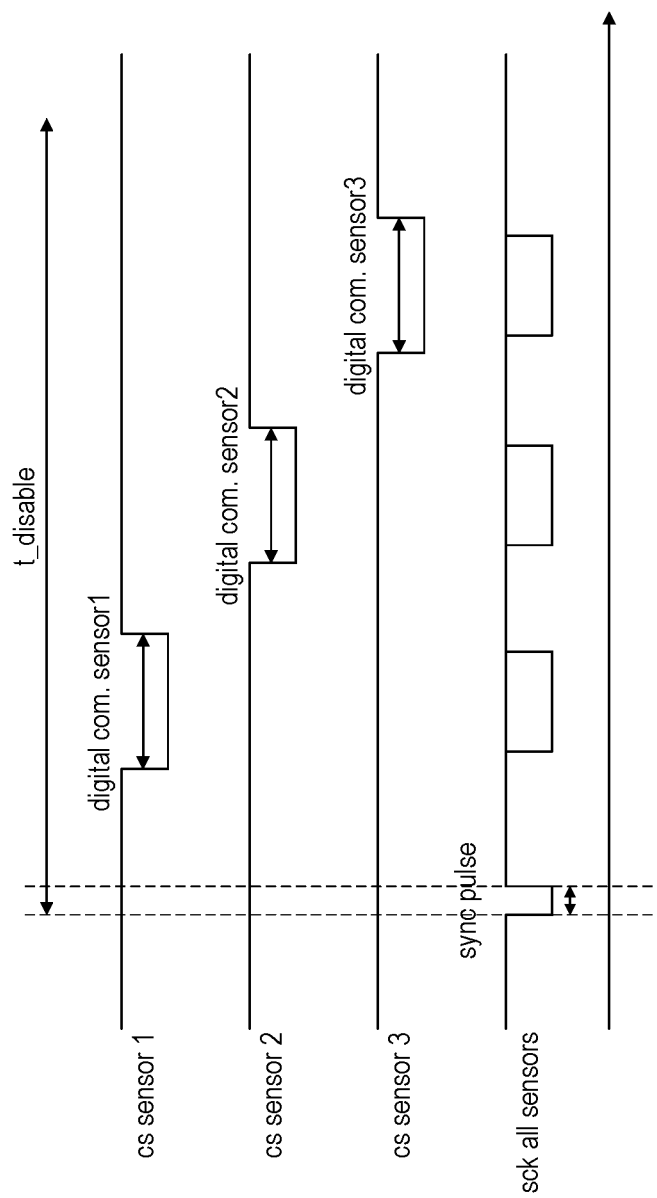
FIG. 5 shows a timing diagram for an electronic system as illustrated in FIG. 4.

FIG. 5 shows a timing diagram for an electronic system as illustrated in FIG. 4. The acquisition of the electronic circuit devices is triggered using the clock terminal sck of the interface. The acquisition may for example be triggered on the falling edge of the synchronization pulse, which can be recognized from the electronic circuit device when the chip select signal cs is high. The trigger may then disabled for a certain duration t_disable, such as to avoid new samples being digitized during the communication phase of the three sensors (as the sck pin will toggle during the communication phase). Once the three sensors have been read out using the standard SPI protocol, and after the duration t_disable is elapsed, the trigger circuit of the sensors is re-enabled and ready for the next synchronization pulse. Alternatively, the synchronization pulse can be configured to be different (e.g. longer or shorter) than the duration of a clock cycle. In this case, the electronic circuit device can recognize the synchronization pulse when the duration of the synchronization pulse is different (e.g. longer or shorter) than a predefined duration, and disabling the trigger becomes optional.

Figure 6:
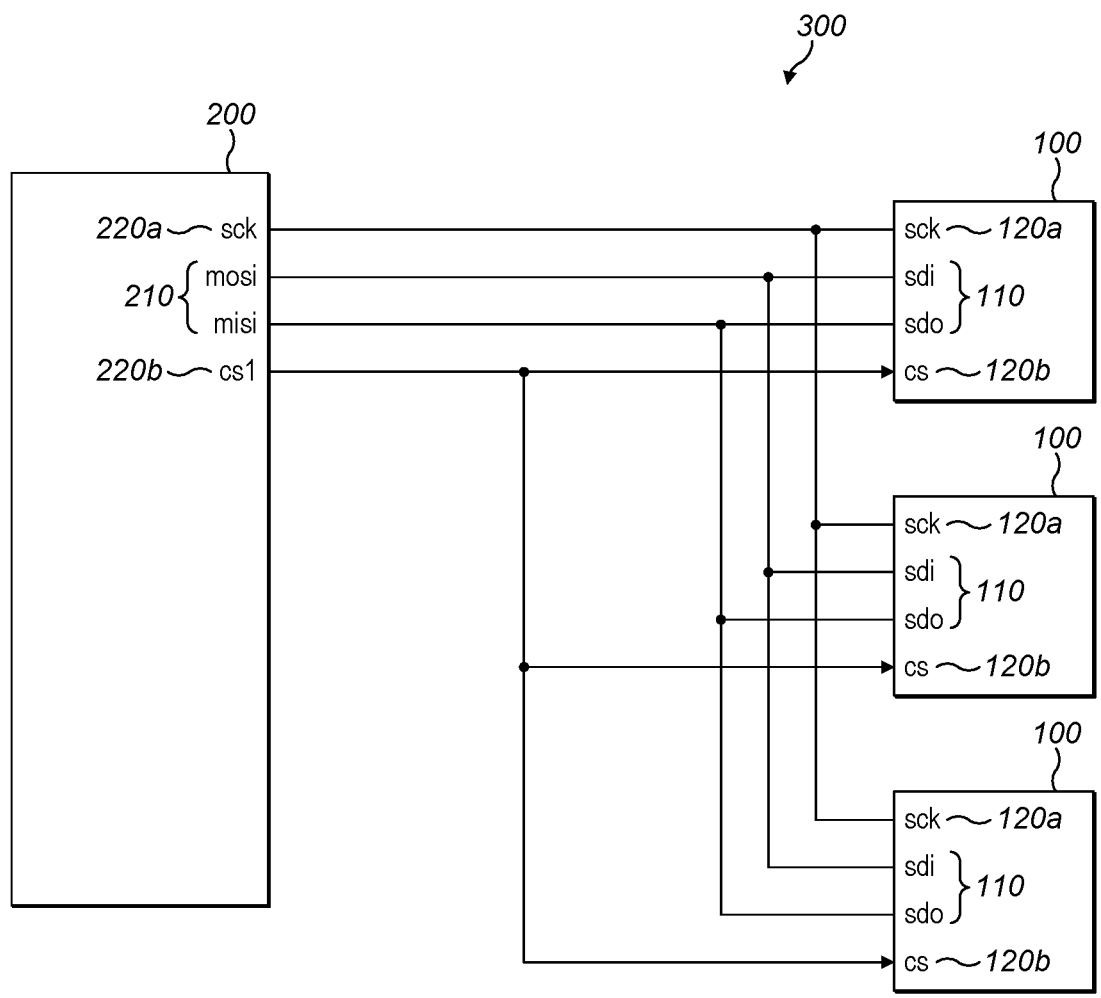
FIG. 6 shows a block diagram of an electronic circuit device and of an electronic system, wherein the synchronization pulse is superimposed on a control or data line internally in the controller, in accordance with embodiments of the present invention.
Figure 7:
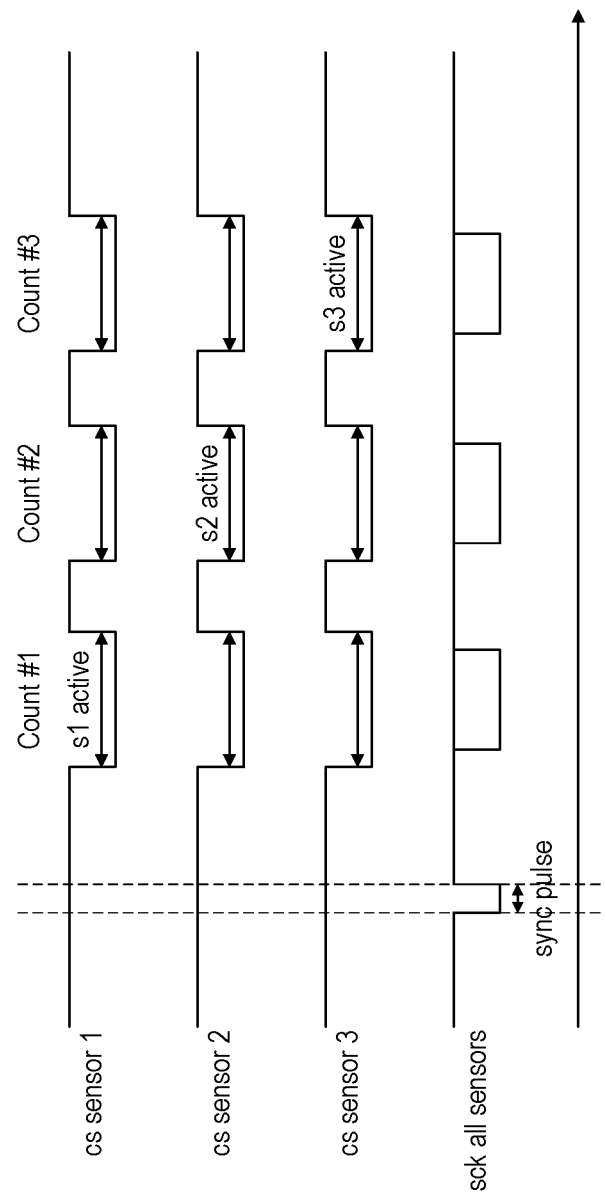
FIG. 7 shows a timing diagram for an electronic system as illustrated in FIG. 6.

FIG. 6 shows a block diagram of an electronic circuit device and of an electronic system, wherein the synchronization pulse is superimposed on a control or data line internally in the controller, in accordance with embodiments of the present invention. In this embodiment, no external component is needed (no OR or AND gate). An SPI interface uses general purpose input/output pins (GPIO). sck, mosi and cs are configured as digital outputs. Therefore, the controller (e.g. microcontroller) can be configured for generating a synchronization pulse on one of those pins before the SPI communication sequence (e.g. using a timer, or interrupt). In this example, the electronic circuit devices are connected to a single CS pin at the controller. In a typical read sequence, the controller issues N sequential SPI communications (N=3 in this case), as if the controller wanted to read N times from a single electronic circuit device. The electronic circuit devices have counting means for counting the number of read sequences and are configured for responding sequentially based on a programmed ID (1, 2, or 3), FIG. 7 shows a timing diagram for an electronic system as illustrated in FIG. 6. In this example the synchronization pulse is sent on sck, but could also be sent on cs. The electronic circuit devices may count the number of falling edges on CS and only respond if the count number corresponds to their ID. The detection of the synchronization pulse on sck may be simplified as the condition will only occur when cs is high. There is not need to disable the trigger. In this example the electronic circuit devices may have a predefined identification number (e.g. programmed or set by external switches).

Figure 8:
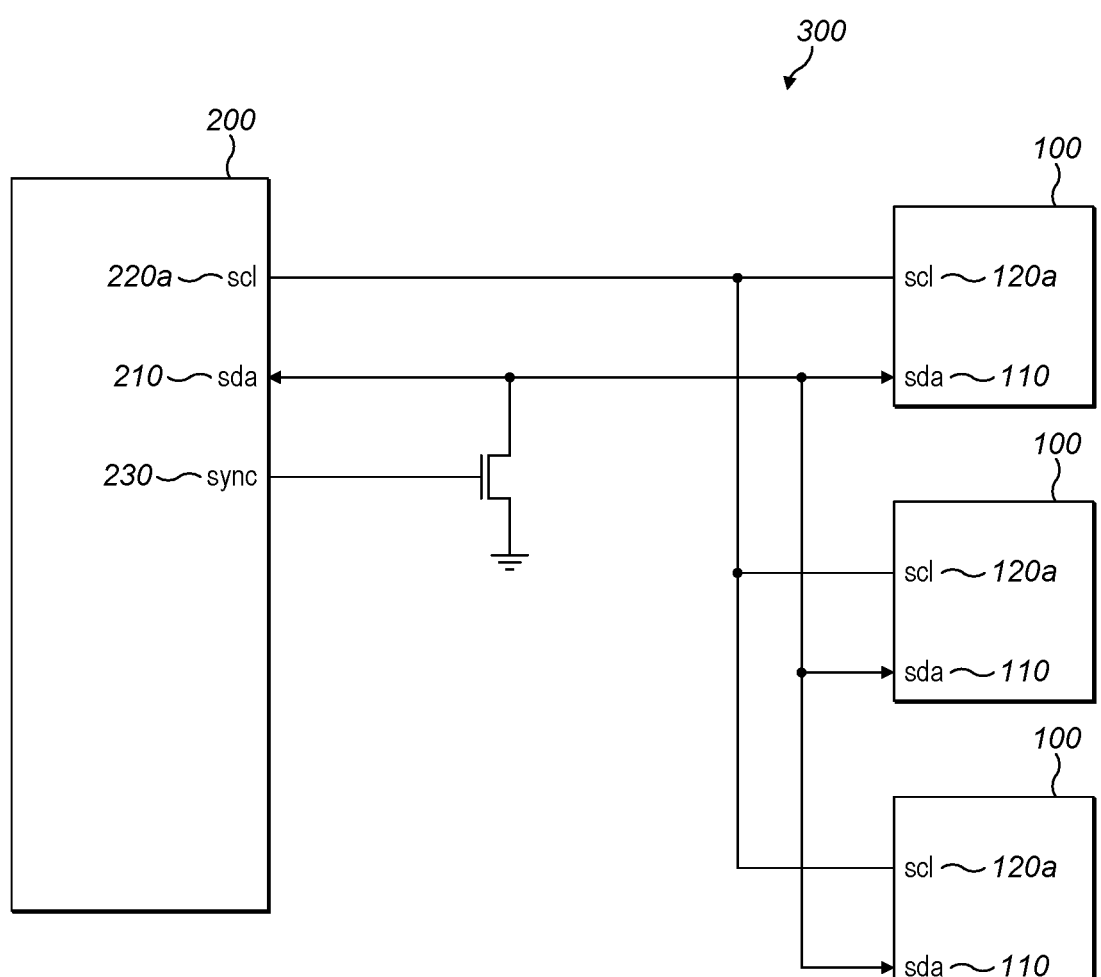
FIG. 8 shows a block diagram of an electronic circuit device and of an electronic system, wherein the communication protocol is the I2C protocol, in accordance with embodiments of the present invention.

FIG. 8 shows a schematic drawing of an electronic system comprising a controller and electronic circuit devices in accordance with embodiments of the present invention. In this example the synchronous serial communication protocol between the controller and the electronic circuit devices is the I2C protocol. In the I2C protocol only to wires are required between the controller and an electronic circuit device. One SCL wire which interconnects the SCL interfaces and is used for passing the clock, and SDA wire which interconnects the SDA interfaces and is used for passing the data. The controller comprises one SCL interface which is connected with the SCL interfaces of all electronic circuit devices and one SDA interface which is connected with the SDA interfaces of all electronic circuit devices. For example, the synchronization pulse may be added to the SDA line. In this example a MOSFET is used to pull the line to ground. When the bus is idle, both SCL and SDA are in a high state. The effect of a synchronization pulse on SDA corresponds to a start condition (falling edge on SDA when SCL is high) followed by a stop condition (rising edge on SDA when SCL is high). This can, therefore, be detected by the electronic circuit devices as the trigger condition (vs. communication sequence). The electronic circuit devices may be configured for triggering an acquisition and latch the data until a read command is requested. When a read command is received (in this the stop condition will not immediately follow the start condition), the sensor transfers the stored data. As discussed earlier, the synchronization pulse can be superimposed to the data line (in this case SDA) using the internal circuitry of the microcontroller and external components are optional.

Figure 9:
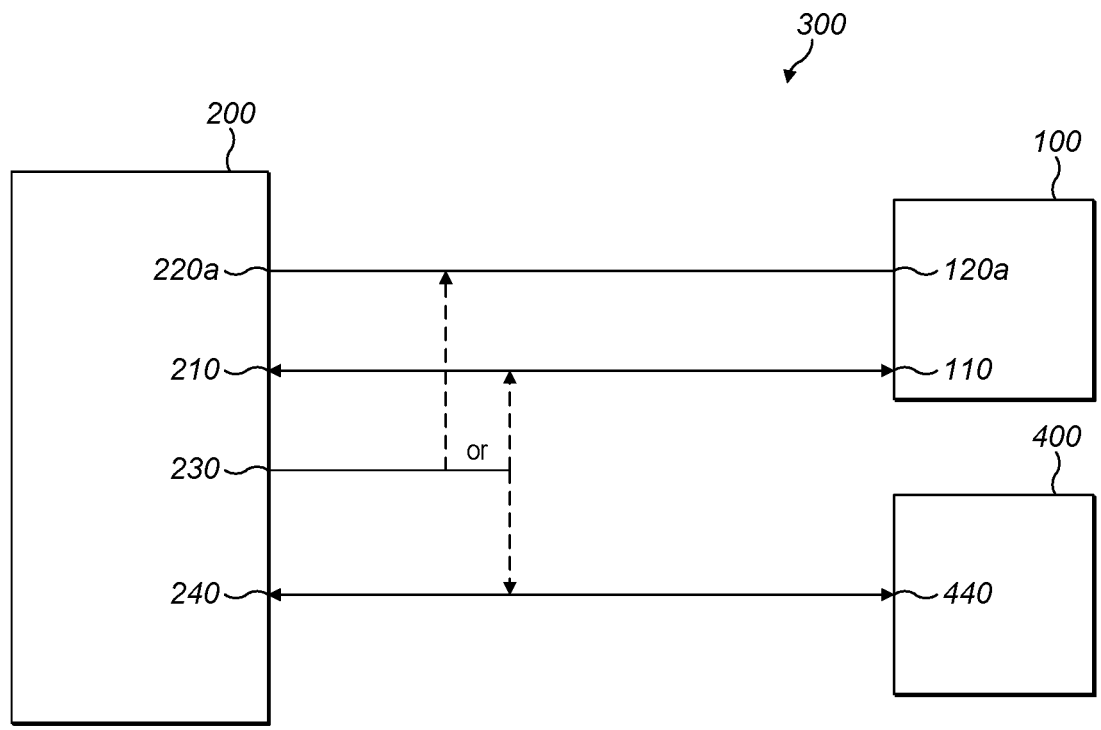
FIG. 9 shows a block diagram of an electronic system, in accordance with embodiments of the present invention, comprising an asynchronous electronic circuit device.

FIG. 9 shows a block diagram of a sensor system 200, in accordance with embodiments of the present invention. Besides the synchronous electronic circuit device 100 as described in the previous examples, the sensor system 200, moreover, comprises an asynchronous electronic circuit device 400. The asynchronous electronic circuit device communicates according to an asynchronous serial protocol and a data line 440. The data line may comprise two or more wires, for example only two wires. The asynchronous electronic circuit device 400 is configured for recognizing a synchronization pulse on a data line 440. The data line 440 is connected with the controller 200 via asynchronous data terminal 240 (e.g. a UART protocol or a protocol derived from UART). The asynchronous electronic circuit device 400 is configured for repetitively measuring the analog signal or for measuring the analog signal when triggered by the synchronization pulse. The asynchronous electronic circuit device 400 is configured for storing one or more digital measurement results or one or more combinations thereof when triggered by the synchronization pulse.

It is an advantage of embodiments of the present invention that also asynchronous electronic circuit devices can be simultaneously triggered for storing the most recent digital measurement result(s) without the need for an additional control line besides the one or more which are already present for transmitting the stored measurement result.

In embodiments of the present invention the asynchronous protocol may for example be the universal asynchronous receiver-transmitter (UART) protocol, or a protocol derived from UART.

It is an advantage of embodiments of the present invention that both sensors having a synchronous protocol and sensors having an asynchronous protocol can be used as this allows to have more flexibility with respect to the location of the controller with respect to the sensors in the system. For example, the sensor(s) located on the same printed circuit board (PCB) as the controller can conform to a synchronous protocol using 2 or more logical signals (e.g. SPI), while sensor(s) located further away from the printed circuit board (such as position sensors) can conform with an asynchronous protocol, for example over a 2-wire differential line (e.g. UART over CAN) such as to be more robust again electromagnetic interference.

It is an advantage of embodiments of the present invention that communication with sensors can be achieved using different protocols, and therefore the reliability and the safety of the system can be increased. In both cases, the synchronization pulse allows to synchronize the measurements.

Figure 10:
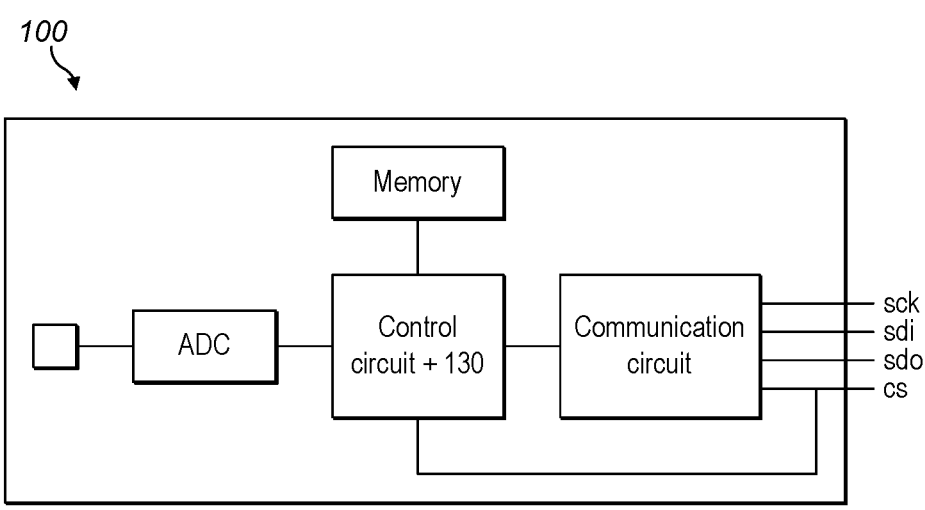
FIG. 10 shows a block diagram of an electronic circuit device in accordance with embodiments of the present invention wherein the detection means is implemented in the control circuit.

FIG. 10 shows a block diagram of an electronic circuit device in accordance with embodiments of the present invention wherein the detection means is implemented in the control circuit. The electronic circuit device comprises an AD converter for converting an incoming analog signal into a digital signal. The AD converter may receive the analog signal from a sensor element. The sensor element may be integrated in the same circuit or can be an external component. The electronic circuit device, moreover, comprises a communication circuit which is configured for communicating in accordance with a synchronous serial communication protocol which in this example is the SPI protocol. The invention is, however, not limited thereto. The electronic circuit device, moreover, comprises memory for storing the digital memory result, and a control circuit connected with the memory, the AD converter, the communication circuit, and the chip select interface. The detection means 130 is implemented in the control circuit. The detection means is arranged for detecting the synchronization pulse (in this example on the CS interface) and trigger the acquisition (in this example the AD conversion) and for storing the digital measurement result in memory. This digital measurement is transmitted in a subsequent read command using a standard digital protocol.

Figure 11:
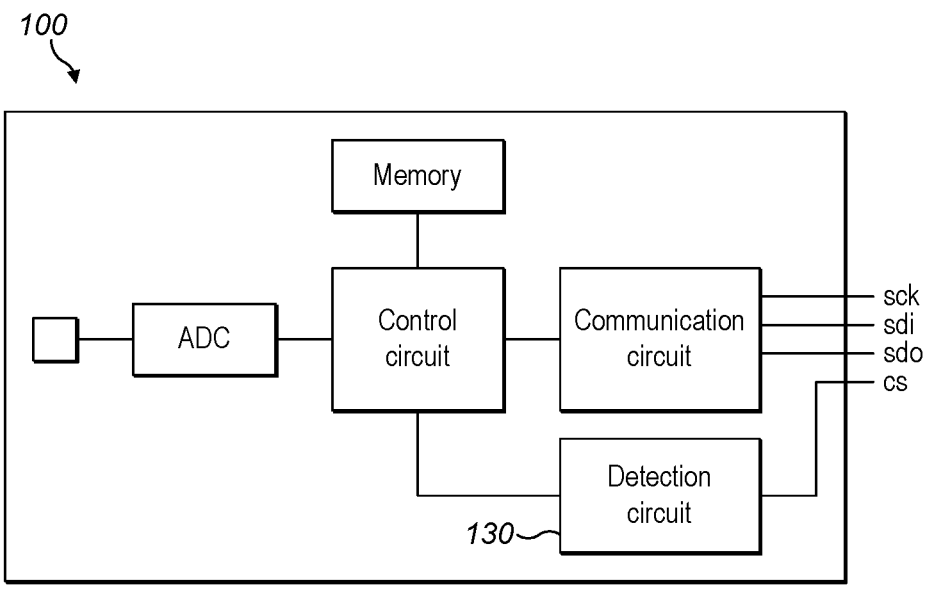
FIG. 11 shows a block diagram of an electronic circuit device in accordance with embodiments of the present invention wherein the detection means is separate from the control circuit.

FIG. 11 shows a block diagram of an electronic circuit device in accordance with embodiments of the present invention wherein the detection means is separate from the control circuit. The detection means is in this example configured for detecting whether a synchronization pulse is being received, and either trigger the control circuit for storing the digital measurement or enabling the communication circuit.

An electronic system according to embodiments of the present invention may for example be used for monitoring the status of a motor. The electronic circuit devices may be sensors for monitoring currents through the motor phases and for monitoring the rotor position, for example magnetic sensors. It is thereby advantageous that the measurements can be simultaneously acquired and that this can be done without the need for additional interface pins at the electronic circuit devices, and hence without the need for additional wiring from the controller to the electronic circuit devices. In such embodiments the synchronization pulse may be derived from the drive signal of the associated electrical motor (e.g. PWM signal). This allows to do the monitoring synchronous with the motor rotation.

Figure 12:
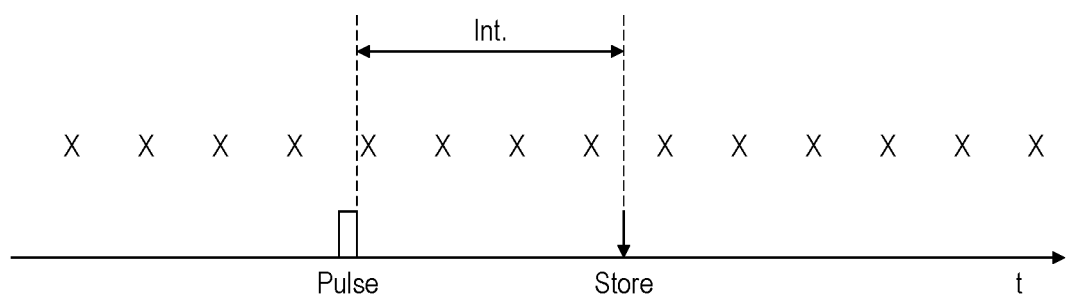
FIG. 12 shows a timing sequence of an electronic circuit device in accordance with embodiments of the present invention.

In embodiments of the present invention the analog signal may be repetitively measured. An example thereof is illustrated in FIG. 12 wherein the x's represent measurements in function of time. In this example the electronic circuit device starts processing the digital measurement results in response to the synchronization pulse. The processing can use digital measurement results acquired before, after, or both before and after the synchronization pulse. After processing the digital measurement results the obtained data results are stored. Processing the digital measurement results may imply combining them. After combining the digital measurement results the one or more obtained combinations of measurement results are stored. The measurement results may for example be filtered. This may for example be achieved using a Kalman filter or using an integration filter. The synchronization pulse may for example start integration of the sampled data in a filter. This is illustrated in FIG. 12. Upon reception of the synchronization pulse the integration of the sampled data starts. At the end of the integration window the filtered data is stored. Starting of the processing may start with an initialization of the processing. In case of a Kalman filter the initialization may for example imply the reset of this filter.

In embodiments of the electronic circuit device may be configured for storing one or more digital measurement results upon receipt of the synchronization pulse.

In embodiments of the electronic circuit device may be configured for storing one or more combinations of digital measurements (e.g. an interpolated value) upon receipt of the synchronization pulse. The digital measurement results can be acquired before or after the synchronization pulse, or both.

In embodiments of the electronic circuit device may be configured for processing the digital measurement results upon receipt of the synchronization pulse. The digital measurement results can be acquired before or after the synchronization pulse, or both.

The invention claimed is:

1. An electronic system comprising a plurality of electronic circuit devices that are each configured for acquiring an analog signal by measuring the analog signal to obtain one or more digital measurement results which are indicative for the analog signal, each electronic circuit device comprising:
    a data line and one or more control lines wherein at least one control line is a clock line, wherein the data line and the one or more control lines are of a synchronous serial communication protocol, wherein each electronic circuit device is configured for transmitting stored data, using the data line and the one or more control lines, in accordance with the synchronous serial communication protocol wherein a clock signal on the clock line is used for synchronizing the data on the data line;
    a detection means configured for recognizing a synchronization pulse on one of the one or more control lines or on the data line, wherein each electronic circuit device is configured for
        repetitively measuring the analog signal; or
        for measuring the analog signal when triggered by the synchronization pulse and
    wherein each electronic circuit device is configured for;
        storing the one or more digital measurement results or one or more combinations thereof when triggered by the synchronization pulse or for processing the digital measurement results and for storing the obtained data when triggered by the synchronization pulse;
    wherein the electronic system further comprise a controller connected with the data line and the one or more control lines of the electronic circuit devices; and
    wherein the electronic system is configured such that a synchronization pulse of the controller is imposed to one of the control lines or on the data line of each electronic circuit device, and wherein the controller is configured for sequentially receiving the measurement results from the different electronic circuit devices.

2. The electronic system according to claim 1, wherein one of the one or more control lines of each electronic circuit device is a chip select line.

3. The electronic system according to claim 1, wherein the detection means of each electronic circuit device is configured for recognizing the synchronization pulse on the chip select line or on the clock line.

4. The electronic system according to claim 1, wherein the synchronous serial communication protocol is a standardized serial communication protocol.

5. The electronic system according to claim 1, wherein the synchronous serial communication protocol is the SPI protocol or the I2C protocol.

6. The electronic system according to claim 1, wherein the detection means of each electronic circuit device is configured for detecting a first edge and a second edge of the synchronization pulse and for recognizing the synchronization pulse when the second edge of the synchronization pulse is detected within a predetermined duration after the first edge.

7. The electronic system according to claim 1, wherein the detection means of each electronic circuit device is disabled after recognizing the synchronization pulse and enabled after a predetermined duration.

8. The electronic system according to claim 1, wherein the detection means of each electronic circuit device is configured for measuring the analog signal on a first edge or a second edge of the synchronization pulse.

9. The electronic system according to claim 1, wherein each electronic circuit device further comprises an internal clock and wherein each electronic circuit device is configured for tuning and/or synchronizing the internal clock using the synchronization pulse.

10. The electronic system according to claim 1, wherein the measured analog signal is a physical quantity and wherein the measurement result is indicative for the physical quantity.

11. The electronic system according to claim 1, the controller comprising a synchronization output line connected with one of the control lines or with the data line of the sensor devices to impose a synchronization pulse of the controller to the connected line.

12. The electronic system according to claim 1, wherein one of the one or more control lines is a chip select line and wherein a signal on the chip select line of an electronic circuit device is the combination of a chip select signal from the controller and a synchronization pulse from the controller.

13. The electronic system according to claim 1, wherein the synchronous serial communication protocol is a standardized serial communication protocol, and wherein a signal on the clock line of an electronic circuit device is the combination of a clock signal from the controller and a synchronization pulse from the controller.

14. The electronic system according to claim 1, wherein the electronic system further comprises an asynchronous electronic circuit device which is configured for transmitting data using an additional data line, and conforming with an asynchronous serial communication protocol, to the controller, wherein the asynchronous electronic circuit device is configured for recognizing a synchronization pulse on the additional data line of the asynchronous electronic circuit device, wherein the asynchronous electronic circuit device is configured for repetitively measuring the analog signal or for measuring the analog signal when triggered by the synchronization pulse and wherein the asynchronous electronic circuit device is configured for storing one or more digital measurement results or one or more combinations thereof when triggered by the synchronization pulse.

* * * * *